(12) United States Patent
Strauser

(10) Patent No.: US 8,675,356 B2
(45) Date of Patent: *Mar. 18, 2014

(54) SYSTEM AND, METHOD FOR HOLDING AND POWERING THREE CONSUMER ELECTRONIC DEVICES

(76) Inventor: Jack Strauser, Pinellas Park, FL (US)

( * ) Notice: Subject to any disclaimer, the term of this patent is extended or adjusted under 35 U.S.C. 154(b) by 194 days.

This patent is subject to a terminal disclaimer.

(21) Appl. No.: 13/345,994

(22) Filed: Jan. 9, 2012

(65) Prior Publication Data

US 2012/0106069 A1 May 3, 2012

Related U.S. Application Data

(63) Continuation-in-part of application No. 13/373,076, filed on Nov. 3, 2011, and a continuation-in-part of application No. 12/699,078, filed on Feb. 3, 2010, now Pat. No. 8,116,077, which is a continuation-in-part of application No. 11/676,850, filed on Feb. 20, 2007, now Pat. No. 7,742,293.

(51) Int. Cl.
*H05K 5/00* (2006.01)
*H05K 7/00* (2006.01)
*G06F 1/16* (2006.01)

(52) U.S. Cl.
USPC ............... 361/679.41; 361/679.4; 361/679.44

(58) Field of Classification Search
USPC ............... 361/679.4, 679.41, 679.44
See application file for complete search history.

(56) References Cited

U.S. PATENT DOCUMENTS

| D513,938 S | * | 1/2006 | Griffin .................. D14/224.1 |
|---|---|---|---|
| 7,399,198 B2 | * | 7/2008 | Thalheimer et al. .......... 439/501 |
| 7,719,830 B2 | * | 5/2010 | Howarth et al. ......... 361/679.41 |
| 7,840,740 B2 | * | 11/2010 | Minoo .......................... 710/303 |
| 8,195,114 B2 | * | 6/2012 | Krampf et al. ............. 455/154.1 |
| 8,366,480 B2 | * | 2/2013 | Neu et al. ..................... 439/569 |
| 8,477,953 B2 | * | 7/2013 | Hobson et al. ................. 381/59 |
| 2004/0150944 A1 | | 8/2004 | Byrne et al. |
| 2006/0013411 A1 | * | 1/2006 | Lin ................................. 381/87 |
| 2006/0116009 A1 | | 6/2006 | Langberg et al. |
| 2006/0127034 A1 | | 6/2006 | Brooking et al. |
| 2006/0181840 A1 | * | 8/2006 | Cvetko .......................... 361/679 |
| 2006/0221776 A1 | * | 10/2006 | Roman et al. .................... 369/1 |
| 2006/0250764 A1 | * | 11/2006 | Howarth et al. ............. 361/683 |
| 2008/0307144 A1 | * | 12/2008 | Minoo .......................... 710/304 |

* cited by examiner

*Primary Examiner* — Anthony Haughton
(74) *Attorney, Agent, or Firm* — Larson & Larson, P.A.; Frank Liebenow; Justin P. Miller

(57) ABSTRACT

A consumer electronic system for holding and providing power to as many as three consumer electronic devices has three cradles in a staggered configuration. One of the cradles is positioned behind and between the remaining two cradles. Thereby the cradle positioned behind the other two cradles is capable of supporting a larger consumer electronic device without blocking the front two cradles. The support walls of the front two cradles provide a surface that supports the larger consumer electronic device.

20 Claims, 7 Drawing Sheets

SYSTEM AND, METHOD FOR HOLDING AND POWERING THREE CONSUMER ELECTRONIC DEVICES

CROSS-REFERENCE TO RELATED APPLICATION

This application is a continuation-in-part of U.S. patent application Ser. No. 12/699,078, filed Feb. 3, 2010; which in turn is a Continuation-in-Part of U.S. patent application Ser. No. 11/676,850 titled "ADAPTABLE DIGITAL MUSIC PLAYER CRADLE," filed Feb. 20, 2007, now U.S. Pat. No. 7,742,293, the disclosure of both is hereby incorporated by reference. This application is also a continuation-in-part of U.S. patent application Ser. No. 13/373,076, filed Nov. 3, 2011. This application is related to U.S. application titled, "SYSTEM, METHOD AND APPARATUS FOR HOLDING MULTIPLE DEVICES," which was filed on even date herewith; attorney docket number 2235.28 and inventor Jack Strauser.

FIELD

This invention relates to the field of consumer electronic devices and more particularly to a system for supporting multiple consumer electronic devices while the consumer electronic devices are, for example, in use and/or charging.

BACKGROUND

Many consumer electronic devices are powered by an internal rechargeable battery and, to recharge the battery, the consumer electronic devices are connected to an external source of electrical power while an internal circuit controls charging of the internal rechargeable battery.

One recharging system includes what is often referred to as a "wall wart." A "wall wart" is typically a sealed transformer and/or power conditioning circuit connected to an typical A/C plug (approximately 117VAC in the USA). Conditioned power from the wall wart is transferred to the consumer electronic device through a cable and a cable connector. The connector mates with a corresponding connector on the consumer electronic device. For example, many new smart phones have miniature USB connectors. These miniature USB connectors mate with male miniature USB connectors at an end of a power cable, in turn connected to a wall wart that provides conditioned 5VDC power. This method of charging works well but causes clutter when users have multiple devices. Additionally, each wall wart that is kept plugged into A/C power drains a small amount of A/C/power even when not charging the consumer electronic devices. This results in a waste of energy.

Lately, there has been a movement to standardize on a voltage of 5VDC. This standard would apply whether power was provided through a miniature USB connector or through a proprietary connector, as is often used with cellular phones. Suppliers of consumer electronic devices often provide a cable having a standard USB connector on one end for connecting to a 5VDC source, and a mating connector for connecting to the consumer electronic device on the other end. The user is able to obtain 5VDC power for the standard USB connector at many sources, such as: wall warts that have a female standard USB connector, computer systems, airport charging stations, female USB connectors in vehicles, etc. Still, many find themselves using this solution with the included wall wart, leaving the wall wart plugged into A/C power for longer than needed.

There are cradles for holding consumer electronic devices and, optionally, use while charging. Some of the cradles use the wall wart provided with the consumer electronic devices. Others have their own power source, though generally still a wall wart. Since the display of the consumer electronic devices is held at an angle, the displays are useful while in these charging cradles. For example, one is able to watch a movie on some consumer electronic devices while the consumer electronic device is held in such cradles. Some such cradles include integrated connectors for directly connecting to the consumer electronic devices. Other cradles provide a cable for connection to the consumer electronic devices.

There are charging stations that have multiple USB female connectors for concurrently charging multiple consumer electronic devices. The charging station typically remains plugged into A/C power and, hence, still wastes energy and creates heat when not in use.

Recently, several manufacturers have created home entertainment systems that have one or more charging stations that connect to the consumer electronic devices, some having cradles to support the consumer electronic devices. Home entertainment systems already use some "parasitic" power to maintain clocks (time of day) and maintain a standby state waiting for a command from a remote control. Therefore, since such devices already use a small amount of "parasitic" power, there is little or no additional power used to make those devices ready to power/charge the consumer electronic devices.

Some such entertainment systems include a docking station for one particular consumer electronic device such as a docking station for one particular manufacturer's digital music player. In some entertainment systems, a consumer electronic device rests in and plugs into a separate, tethered, docking pod. In other entertainment systems the consumer electronic device has a cradle with or without a connector for the consumer electronic device.

In modern times, many individuals and families own multiple devices that need charging several times per week. For example, on any given day, a single person owning a smart phone, digital music player, and a tablet PC will find a need to charge one or more of these consumer electronic devices. There are charging stations that accept multiple devices, having cradles for smaller devices such as smart phones, yet requiring larger consumer electronic devices (e.g. tablet PCs) to rest on a horizontal surface. There are many drawbacks to resting such larger consumer electronic devices horizontally including, but not limited to, increasing the risk of damage from setting heavy objects on the larger consumer electronic device's display, splatter from nearby sources of liquids (e.g., sinks), increased dust adhesion, fluid penetration from a nearby spill, etc.

Some recent consumer products include charging ports and locations for holding one or more consumer electronic devices. There are many amplified speaker systems or clock radio systems that include a cradle with or without an integrated connector for one particular consumer electronic device. These consumer electronic devices generally support exactly one consumer electronic device. There is at least one consumer electronic device manufactured by Hammacher Schlemmer that supports two digital music players of one particular manufacturer, side-by-side, within a single cavity.

There are several problems with existing consumer electronic systems that support one or more consumer electronic devices. Many or all such consumer electronic systems support consumer electronic i-devices (e.g. those made by a particular manufacturer that names their products starting with an "i") from only a single manufacturer. Many or all such consumer electronic systems support only a small, very limited size range of consumer electronic devices, typically only one or a small subset of all possible consumer electronic devices such as one i-device. Many or all such consumer electronic systems do not support larger consumer electronic devices such as tablet computers. Many or all such consumer electronic systems do not concurrently support smaller consumer electronic devices concurrently while supporting larger consumer electronic devices such as tablet computers. Many or all such consumer electronic systems do not provide proper physical support for larger consumer electronic devices such as tablet computers.

What is needed is a system that will support and charge a mix of consumer electronic devices in a proper orientation.

SUMMARY

A consumer electronic system for holding and providing power to as many as three consumer electronic devices has three cradles in a staggered configuration, such that, one of the cradles is positioned behind and between the remaining two cradles, thereby the cradle that is positioned behind the other two cradles is capable of supporting a larger consumer electronic device without blocking the front two cradles and support walls of the front two cradles provide a surface that supports the larger consumer device.

In one embodiment, a consumer electronic system is disclosed having an enclosure and three cradles extending from the enclosure. Each cradle has a cavity and a support wall. The cavity is sized to partially contain at least a first consumer electronic device such that the first consumer electronic device rests against the support wall. A first cradle of the three cradles is positioned between and behind a second and third cradle of the three cradles such that a second consumer device supported by the first cradle rests against the support wall of the first cradle and an edge of the second consumer device rests against a back surface of the support walls of at least one of the second and third cradles.

In another embodiment, a method of charging a consumer electronic device is disclosed, the method includes connecting a first end connector of a data/power cable to a first consumer electronic device. The data/power cable designed for the first consumer electronic device. The data/power cable is routed through a cable trough of a first cradle of three cradles. The three cradles are attached to a consumer electronic system and the first cradle is staggered behind and between the second cradle and the third cradle. Next, the first consumer electronic devices is placed into the first cradle, such that a back side of the first consumer electronic device rests against a support wall of the first cradle and a forward edge of the first consumer electronic device is held by at least one back side of the support wall of one of the second and third cradles. Next, a second end connector of the data/power cable is plugged (inserted, connected) into a receptacle of the consumer electronic system, thereby providing power to the first consumer electronic device.

In another embodiment, a consumer electronic system is disclosed including an enclosure and three cradles extending upward from a back surface of the enclosure. Each cradle has a cavity and a support wall. The cavity is sized to partially contain at least a first consumer electronic device while the first consumer electronic device rests against the support wall. The support wall includes a cable trough. A first cradle of the three cradles is positioned between and behind a second and third cradle of the three cradles such that a second consumer device supported by the first cradle rests against the support wall of the first cradle and an edge of the second consumer device rests against a back surface of the support walls of at least one of the second and third cradles.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
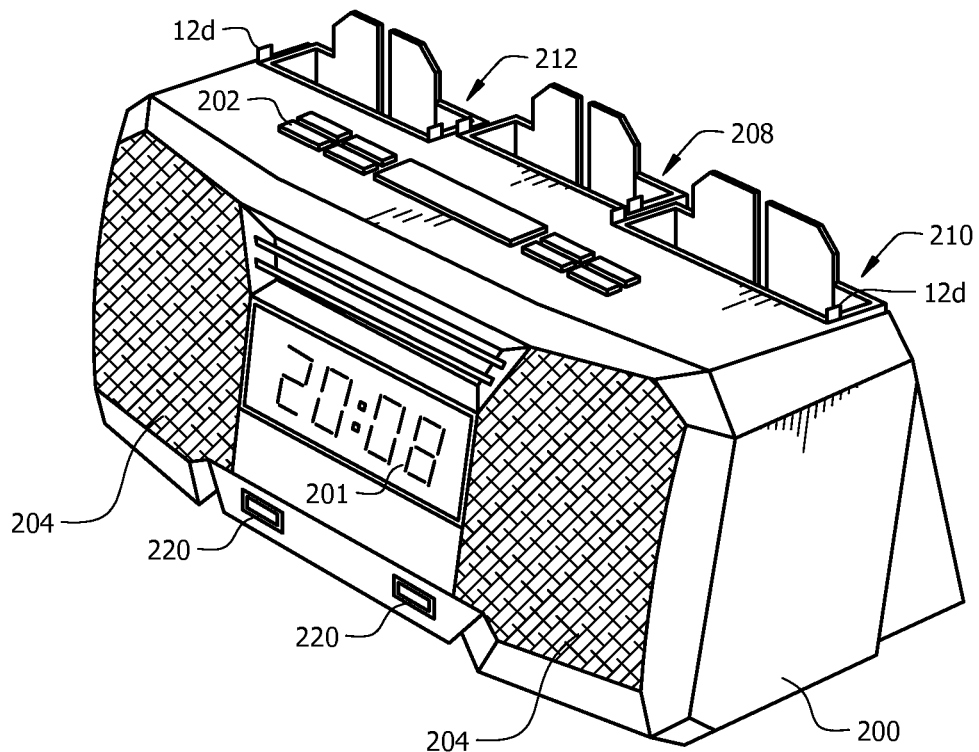
FIG. 1 illustrates a front perspective view of a consumer electronic system having multiple consumer electronic device cradles.

Reference will now be made in detail to the presently preferred embodiments of the invention, examples of which are illustrated in the accompanying drawings. Throughout the following detailed description, the same reference numerals refer to the same elements in all figures.

Throughout this description, the term, "consumer electronic device" refers to devices such as digital music players (i-devices, MP3 players, etc.), digital media players (e.g., MP4 players, movie players), cellular phones (e.g., smart phones, i-phones), portable Global Positioning Satellite (GPS) devices, tablet computing devices (e.g. i-tablet computers, etc.). Any portable consumer electronic device is anticipated, whether or not the consumer electronic device has an internal rechargeable power source. Some consumer electronic devices have persistent storage for storing audio content (music) or video content (movies) such as a micro-hard disk or flash memory. Under user control, these files are retrieved, uncompressed and converted to audio and/or video. The analog audio signal is often emitted in a 3.5 mm stereo headphone jack for the user to connect headphones or other reproduction devices. Some devices have a specialized data/power connector for connecting to a source of power and/or transferring data (e.g. music) to/from the consumer electronic device. Many consumer electronic devices have graphical displays.

Throughout this description, the term, "consumer electronic system" refers to systems that supports/holds and optionally charges consumer electronic device. Consumer electronic systems optionally perform other functions such as amplifying audio and presenting the audio through speakers, displaying the time, clock radio functions, etc.

Throughout this description, the term, "USB port" refers to an industry standard interface port, commonly known as "Universal Serial Bus." This particular port has become ubiquitous for many applications and uses, many of which do not utilize the integrated high-speed serial interface, and, instead, use only the standard power connection for powering of devices connected to the USB ports (e.g., digital music players, smart phones . . . ). Although the specific term, "USB" is used throughout this description and drawings, the invention and claims are not limited to any particular port or type of port, nor limited to using such port for power only, power and communications, or communications only.

Figure 2:
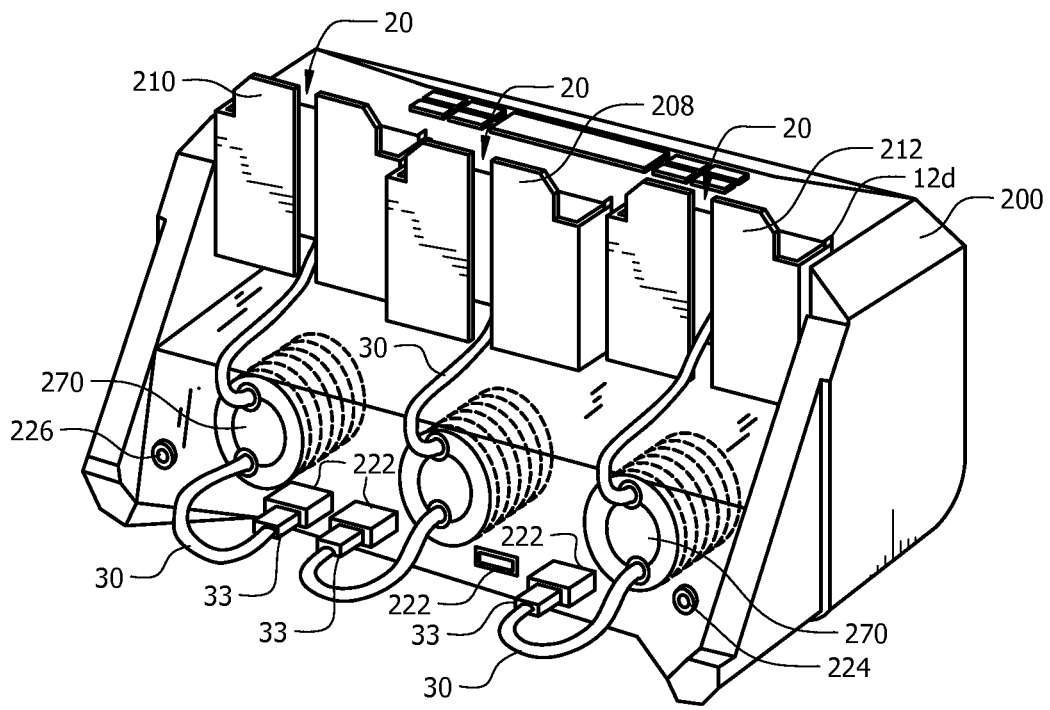
FIG. 2 illustrates a rear perspective view of the consumer electronic system having multiple consumer electronic device cradles.

Referring to FIGS. 1 and 2, front (FIG. 1) and rear (FIG. 2) perspective views of a consumer electronic system 200 having multiple consumer electronic device cradles 208/210/212 are shown. In the examples shown, the consumer electronic system 200 includes an enclosure in the form of a clock radio 200 having a display 201, speakers 204, control buttons/switches 202, and electrical components/circuitry (internal—not visible). The clock radio 200 is one example of such a consumer electronic system 200 and any other consumer electronic system 200 is anticipated. Such anticipated consumer electronic systems 200 include, but are not limited to, amplified speakers, home stereo systems, consumer electronic device charging stations, personal computers, etc. The consumer electronic system 200 has an enclosure, typically made from a hard material such as plastic or metal.

Several industry standard receptacles 220/222, herein referred to as USB ports 220/222, though not limited to USB ports 220/222, are provided for connection to devices that require power from such ports. By providing such standardized ports 220/222, it is anticipated that a wide variety of consumer electronic devices is supported, using cables that already exist for connection to such devices. Extra front or side located industry standard receptacles 220 are provided in anticipation of additional consumer electronic devices that require power from such ports. For example, the additional industry standard receptacles 220 are used if a user has more consumer electronic devices than the number of provided cradles 208/210/212. Although two front-located USB ports 220 are shown, any number and location of such extra USB ports 220 is anticipated.

To hold consumer electronic devices, perhaps while charging or while in use, several cradles 208/210/212 are provided on a surface of the consumer electronic system 200. In some embodiments, the cradles 208/210/212 are fixedly attached or integrated into the consumer electronic system 200. In such embodiments, the resulting system is restricted to supporting (holding) devices that fit within the fixed cradles 208/210/212. Being that there are a large number of sizes and shapes of consumer electronic devices, each type of cradle 208/210/212 is sized and shaped to support a subset of such consumer electronic devices. For example, in one version of cradles 208/210/212, i-devices fit snuggly within the cradles 208/210/212, while in another version of cradles 208/210/212, devices from another manufacturer snugly fit with the cradles 208/210/212.

In other embodiments, the cradles 208/210/212 are formed/manufactured as distinct components and removably attach to the consumer electronic system. In these embodiments, there are two or more types of cradles 208/210/212 that are interchangeable. Each type of cradle 208/210/212 supports/holds different sizes and shapes of consumer electronic devices. This versatility increases the size of the subset of consumer electronic devices supported up to and including the full range of known consumer electronic devices. Furthermore, it is anticipated that new cradles 208/210/212 are deployed to address unique sizes and shapes of new consumer electronic devices. This prevents the user from needing to purchase a new consumer electronic system 200. When a new size or shape of cradle is needed, only the cradles 208/210/212 are replaced, reducing cost and reducing outdated products that prematurely get discarded.

The construction and attachment of the cradles 208/210/212 will be described later. In the example shown, the cradles 208/210/212 include optional nubs 12d for holding consumer electronic devices that are either rotated horizontally or are too wide to fit within the cradles 208/210/212.

Several USB ports 222 are provided in the vicinity of the cradles 208/210/212 for providing power and/or data connections to the consumer electronic devices that are in/on the cradles 208/210/212. For example, the standard USB plug 33 of power and/or data cables 30 is plugged into the USB ports 222. A connector (not visible) at the other end of the power and/or data cables 30 is then connected to the consumer electronic devices. The cable 30 is shown wound in a compartment for cable management, with the cable routed through the optional cable trough 20 for connection to the consumer electronic device.

In some embodiments, an audio input jack 224 is provided for audio connection to one or more of the consumer electronic devices 50/56/60 supported by the cradles 208/210/212. One end of an audio cable is connected to the consumer electronic devices 50/56/60 supported by one of the cradles 208/210/212, and the other end of the audio cable is connected to the audio input jack 224. The audio input jack 224 transmits analog (or digital) audio data from the consumer electronic device 50/56/60 to the consumer electronic system 200 for reproduction at the speakers 204.

Although any power source is anticipated for the consumer electronic system 200, including internal batteries, in the example shown a power input jack 226 is provided for accepting AC or DC power from a standard power source, or from a wall-wart power supply, etc.

In some embodiments, an optional cable management features is included. An exemplary cable management system is shown in FIG. 2. In the cable management system the excess cables are wrapped into loops, or wrapped around spools, then pushed into cavities in the base of the consumer electronic system 200 and, optionally protected with covers 270.

Figure 3:
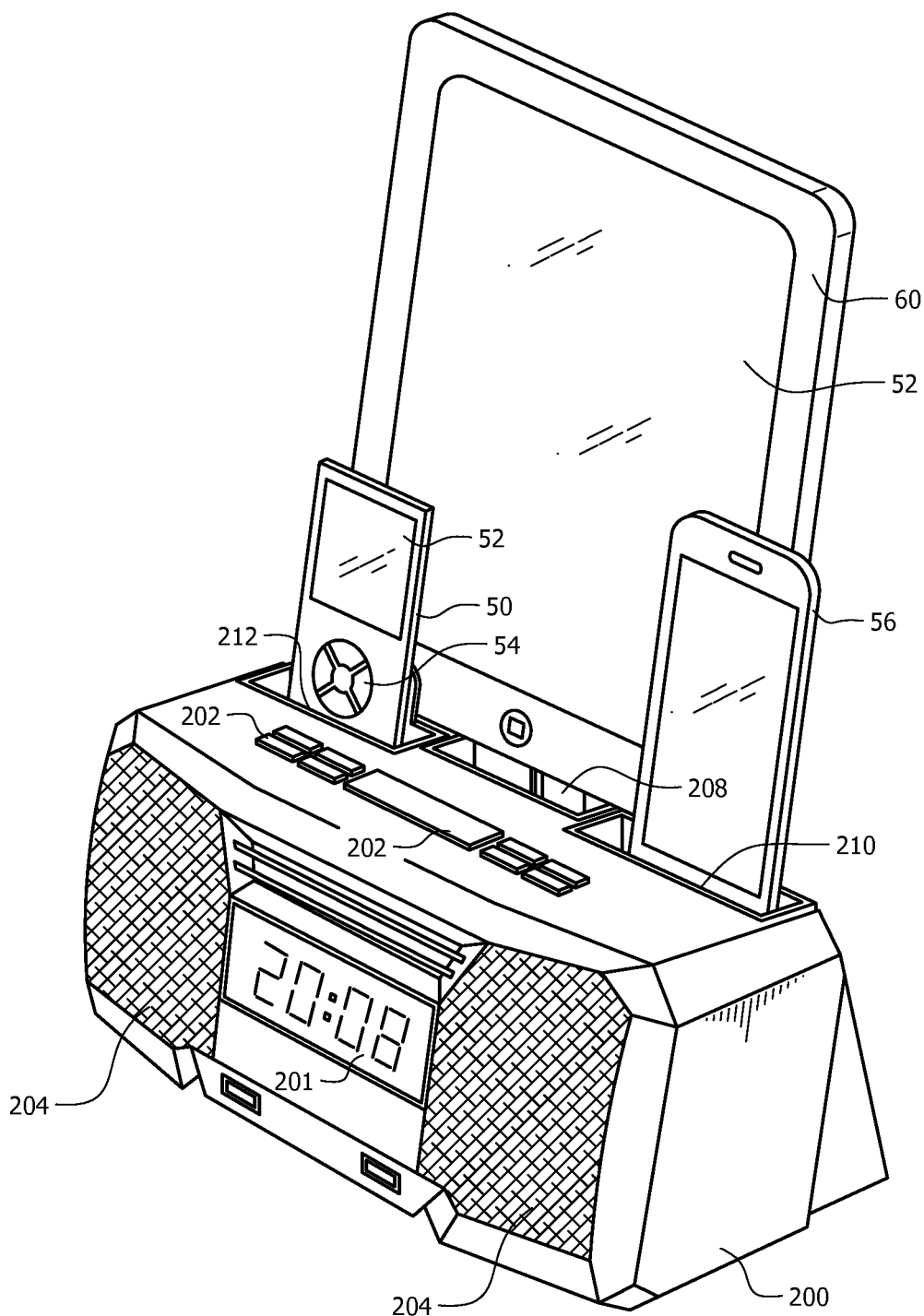
FIG. 3 illustrates a front perspective view of the consumer electronic system with multiple consumer electronic devices supported in cradles.

Referring to FIG. 3, a front perspective view of the consumer electronic system 200 with multiple consumer electronic devices 50/56/60 supported in cradles 208/210/212 is shown. The staggered locations of the cradles 208/210/212 is preferred because some consumer electronic devices 60 are wide (e.g. a tablet computer 60). Staggering enables the larger consumer electronic devices 60 to be held in the rear cradle 208 while not encroaching on the forward cradles 210/212, thereby allowing concurrent use of the forward cradles 210/212 for smaller consumer electronic devices (e.g. a digital music player 50 and a smart phone 56). A further advantage of said staggering is visible in FIG. 3 in which a lower front edge of the larger consumer electronic device 60 in the rear cradle 208 rests against the rear surface of the support walls 14 of the forward cradles 210/212 (see FIGS. 5 and 6), preventing the consumer electronic device 60 from sliding forward.

The consumer electronic devices 50/56/60 typically have displays 52 (e.g. LCDs) and either keypads/buttons 54 for controls or touch screen interfaces presented on the displays 52. The consumer electronic devices 50/56/60 shown are examples of such devices and the exemplary devices shown are not meant to be exclusive. There are many sizes, shapes and configurations of consumer electronic devices 50/56/60.

Figure 4:
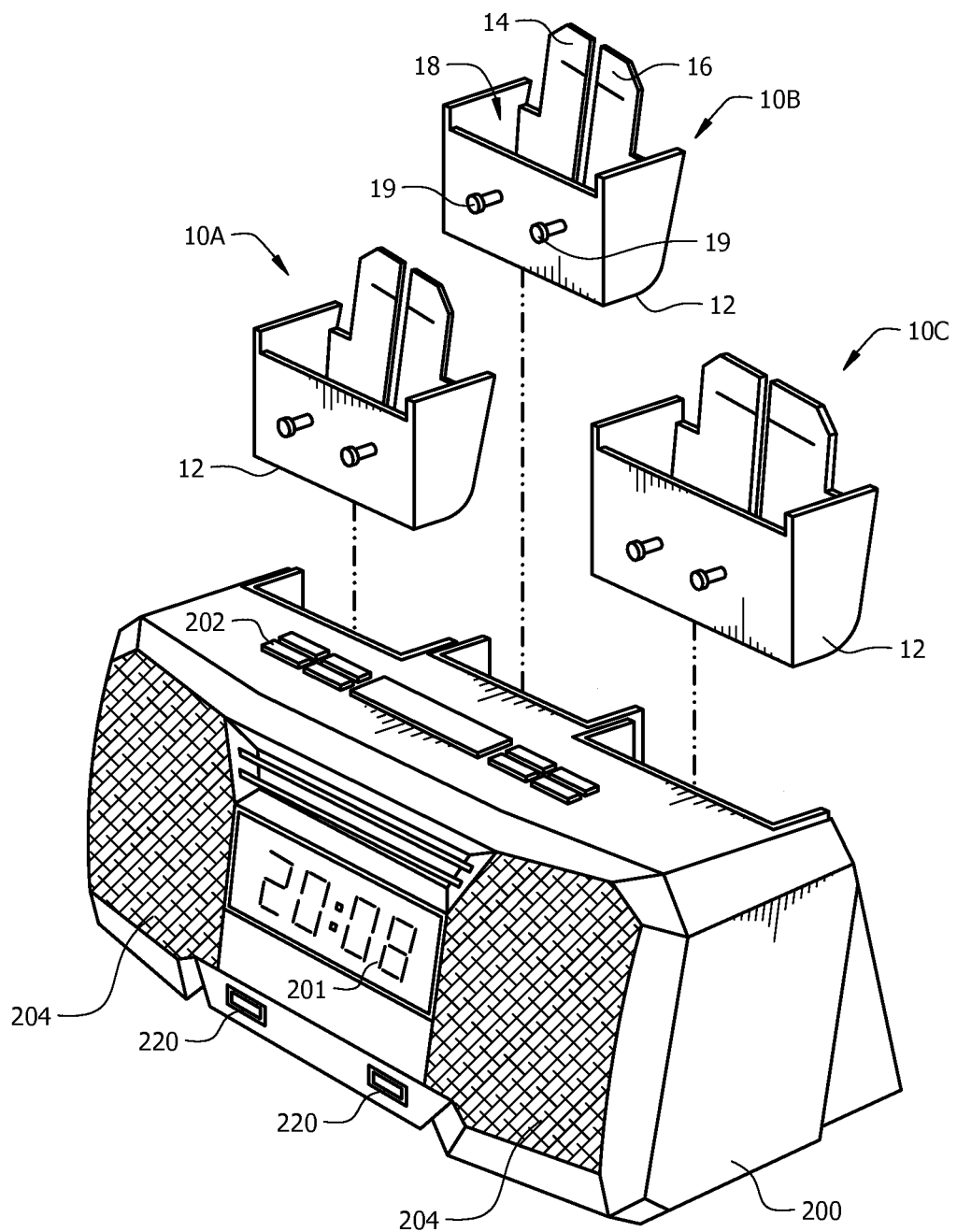
FIG. 4 illustrates a front perspective view of a consumer electronic system having multiple removable consumer electronic device cradles.

Referring to FIG. 4, a front perspective view of a consumer electronic system 200 having multiple removable consumer electronic device cradles 10A/10B/10C is shown. As discussed previously, there are many advantages of removable cradles 10A/10B/10C. It is fully anticipated that any number of fixed cradles 208/210/212 and/or removable cradles 10A/10B/10C be included with a particular consumer electronic system 200 in any combination. In this example, each of the exemplary removable cradles 10A/10B/10C has a base 12, a cavity 18 for containing an end of the consumer electronic device and a support wall 14 for supporting the consumer electronic device, preferably on a slight slant towards the rear. In some embodiments, a pair of front clip indentations 16 is provided to hold clip-on micro-sized consumer electronic devices (not shown). The height of the support wall 14 is such that the consumer electronic device rests against the support wall 14 without falling over. Therefore, it is anticipated that, in some embodiments, the support wall 14 is taller and/or shorter than shown in FIG. 4. A taller support wall 14 for the rear staggered cradle 10B is anticipated for supporting larger consumer electronic devices 50/56/60 such as tablet computers 60. In some embodiments, one or all of the support walls 14 are extendable (not shown) and/or a separate extender (not shown) is provided to extend the height of one or all support walls 14.

For removably attaching the cradles 10A/10B/10C to the consumer electronic system 200, a mounting system is provided such as mounting posts 19 that depend from the front surface of the base 12 of the cradles 10A/10B/10C. These mounting posts 19 slide into key holes (not shown) on a surface of the consumer electronic system 200 (e.g., a back surface of the consumer electronic system).

Although all cradles 10A/10B/10C are shown having one particular connection system consisting of mounting posts 19 that mate with corresponding key holes (not shown) on a surface of the consumer electronic system 200, any known removable attachment system is anticipated. Such anticipate cradles 10A/10B/10C include, but are not limited to, mounting posts 19 and key holes, mounting slots that slide into mating mounting slots, hook-and-loop material, partially adhesive materials, etc. Several mounting systems are shown in the priority documents that are included by reference.

For support of multiple sizes of consumer electronic devices 50/56/60, there are several optional features for the cradles 10A/10B/10C. One optional feature snuggly supports several different sizes of a subset of all consumer electronic devices 50/56/60 without requiring inserts or removable sections. With such optional feature, the cradles 10A/10B/10C are supplied with one or more inner sub-cavities formed by a number of ledges, as disclosed in U.S. patent application Ser. No. 12/699,078. This patent application was previously incorporated by reference. Using these inner sub-cavities, the smaller sized consumer electronic device 50/56/60 will fit snuggly in the deepest inner sub-cavity; the next larger consumer electronic device 50/56/60 will fit snuggly in the next higher inner sub-cavity; etc.

Figure 5:
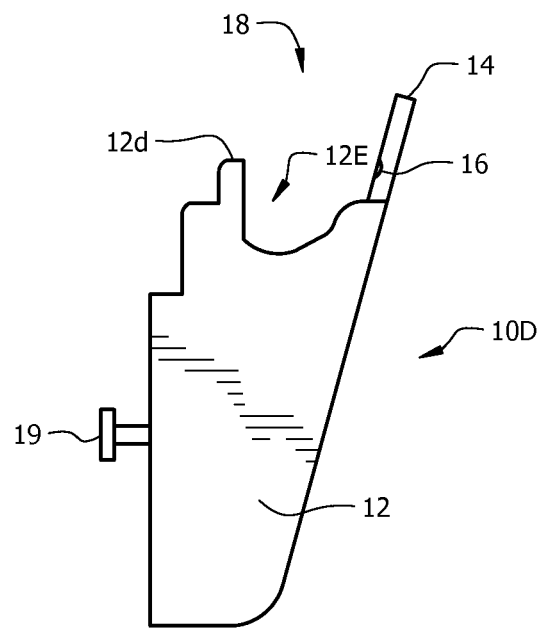
FIG. 5 illustrates a side plan view of a consumer electronic device cradle.
Figure 6:
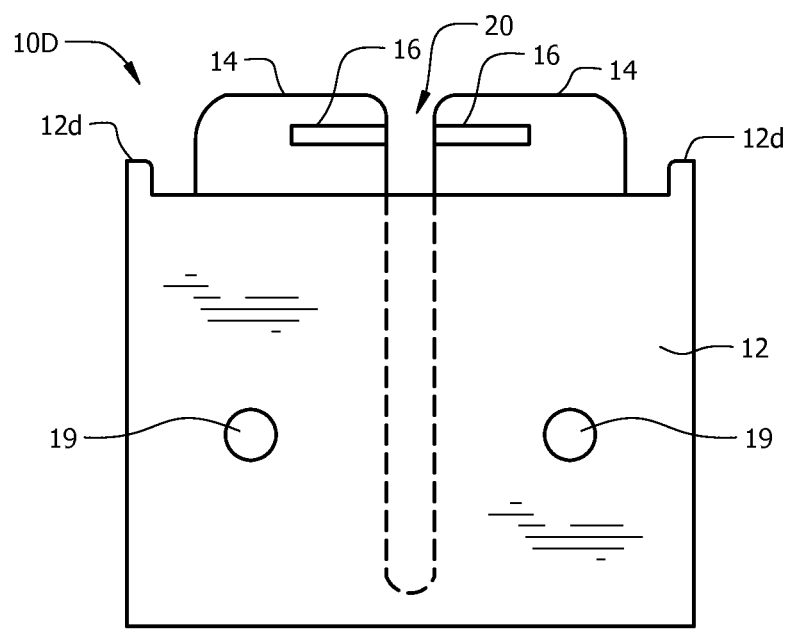
FIG. 6 illustrates a front plan view of a consumer electronic device cradle.

Although not required, the cradles 10A/10B/10C optionally have horizontal/vertical support features as shown in detail in the examples of FIGS. 5 and 6. Some embodiments of the cradles 10A/10B/10C include the optional horizontal/vertical support features of the cradles 10D shown in FIGS. 5 and 6. These features include one or both of a beveled side edge 12e and a nub 12d. The beveled side edge 12e and/or nub 12d provide support for a consumer electronic device 50/56/60 that either does not fit within the cavity 18 or, because of user preference, is rotated either 90 degrees or −90 degrees from horizontal. For some consumer electronic devices 50/56/60, the longer edge of the consumer electronic device 50/56/60 will not fit within the cavity 18. In such a situation, one of the longer side edges of the consumer electronic device 50/56/60 rests on and is supported by one or both of the beveled side edge 12e and the nub 12d.

Referring to FIGS. 5 and 6, a side plan view (FIG. 5) and a front plan view (FIG. 6) of a consumer electronic device cradle 10D for horizontal/vertical support is shown. The consumer electronic device cradle 10D has a base 12, a cavity 18 for containing an end of the consumer electronic device and a support wall 14 for supporting the consumer electronic device, preferably on a slight slant towards the rear. In some embodiments, a pair of front clip indentations 16 is provided to hold clip-on micro-sized consumer electronic devices (not shown). The same style cradle 10D is also anticipated as a non-removable cradle as described above. The height of the support wall 14 is such that the consumer electronic device rests against the support wall 14, preferably without falling over. Therefore, it is anticipated that, in some embodiments, the support wall 14 is taller than shown in FIGS. 5 and 6, especially the support wall 14 of the rear staggered cradle 10D for supporting larger consumer electronic devices 50/56/60 such as tablet computers 60. In some embodiments, one or all of the support walls 14 are extendable (not shown) and/or a separate extender (not shown) is provided to extend the height of one or all support walls 14.

For removably attaching the cradle 10D to the consumer electronic system 200, a mounting system is provided such as mounting posts 19 that extend from the front surface of the base 12 of the cradle 10D. These mounting posts 19 slide into key holes (not shown) on a surface of the consumer electronic system 200 (e.g., a back surface of the consumer electronic system). As discussed, many removable attachment mechanisms are anticipated.

Although the cradle 10D is shown having one particular connection system consisting of mounting posts 19 that mate with corresponding key holes (not shown) on a surface of the consumer electronic system 200, any known removable attachment system is anticipated including, but not limited to, mounting posts 19 and key holes, mounting slots that slide into mating mounting slots, hook-and-loop material, partially adhesive materials, etc. Several mounting systems are shown in the priority documents that are included by reference.

The cradles 10A/10B/10C/10D/208/210/212 optionally have a cable trough 20 for routing a data and/or power cable from the consumer electronic device 50/56/60 to the USB ports 220/222.

Figure 7:
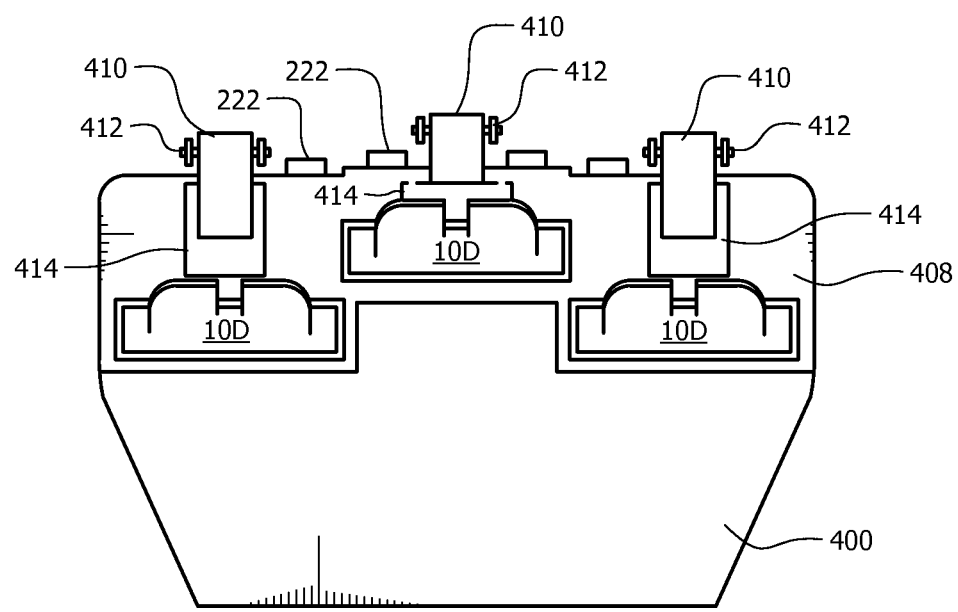
FIG. 7 illustrates a top plan view of a consumer electronic system having three cradles and folding cable management.
Figure 8:
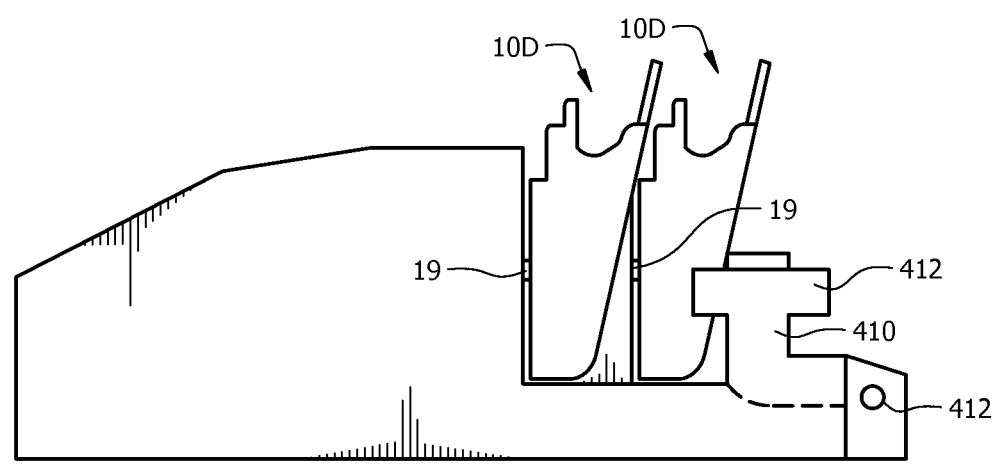
FIG. 8 illustrates a side plan view of a consumer electronic system having three cradles and folding cable management.

Referring to FIGS. 7 and 8, a top plan view of a consumer electronic system 400 having three cradles 10D and folding cable management 410/412/414 and a side plan view of a consumer electronic system 400 having three cradles 10D and folding cable management 410/412/414 is shown. As above, the consumer electronic system 400 includes an enclosure and internal electronics in the form of any type of consumer electronic system such as a clock radio, charging station, amplified speakers, etc. In this example, there are three cradles 10D in a staggered configuration, though any number of cradles 10D is anticipated. The cradles 10D are either removable or fixed (e.g. part of the consumer electronic system 400 or permanently affixed to the consumer electronic system 400). In the examples shown, the cradles 10D are removable and the mounting peg 19 is visible. It is anticipated that when the cradles 10D are in place, the mounting arrangement is not visible and the consumer electronic system 400 appears as if the cradles 10D are permanently attached.

Again, any cradle 10D attachment mechanism and any type/format of cradle 10D are anticipated.

Many consumer electronic devices 50/56/60 are supplied with cables that, at one end has a connector 31 (see FIG. 9) that mates with the consumer electronic device 50/56/60, and at the other end have a standard size USB plug. Often these cables are long, for example between three feet and six feet long. Such lengths create a cable management issue, especially when three or more consumer electronic devices 50/56/60 are supported. To reduce cable clutter, several optional cable management features are shown. The first cable management system is shown in FIG. 2. In this system, the excess cables are wrapped into loops or wrapped around spools then pushed into cavities in the base of the consumer electronic system 400 and, optionally covered with covers 270.

In a second cable management system, shown in FIGS. 7 and 8, the excess cable is wrapped around spools 410/414. To enable winding of the spools 410/414, in some embodiments, the spools 410/414 are hingedly coupled to the consumer electronic system 400, for example to a base 408 of the consumer electronic system 400. In the example shown in FIGS. 7 and 8, the spools 410/414 are hingedly coupled to the base 408 by pins 412. Any hinged and/or bendable system is anticipated. For example, in some embodiments, the spool arm 410 is flexible enough as to bend outwardly for wrapping the excess cable, and then bend back against the cradles 10D after winding.

In the example shown, to compensate for the staggered center cradle 10D, the spool cap 414 behind the center cradle 10D is orientated side-ways. This orientation is in contrast to the spool caps 414 behind the forward mounted cradles 10D, which are oriented in-line with the forward cradles 10D.

Figure 9:
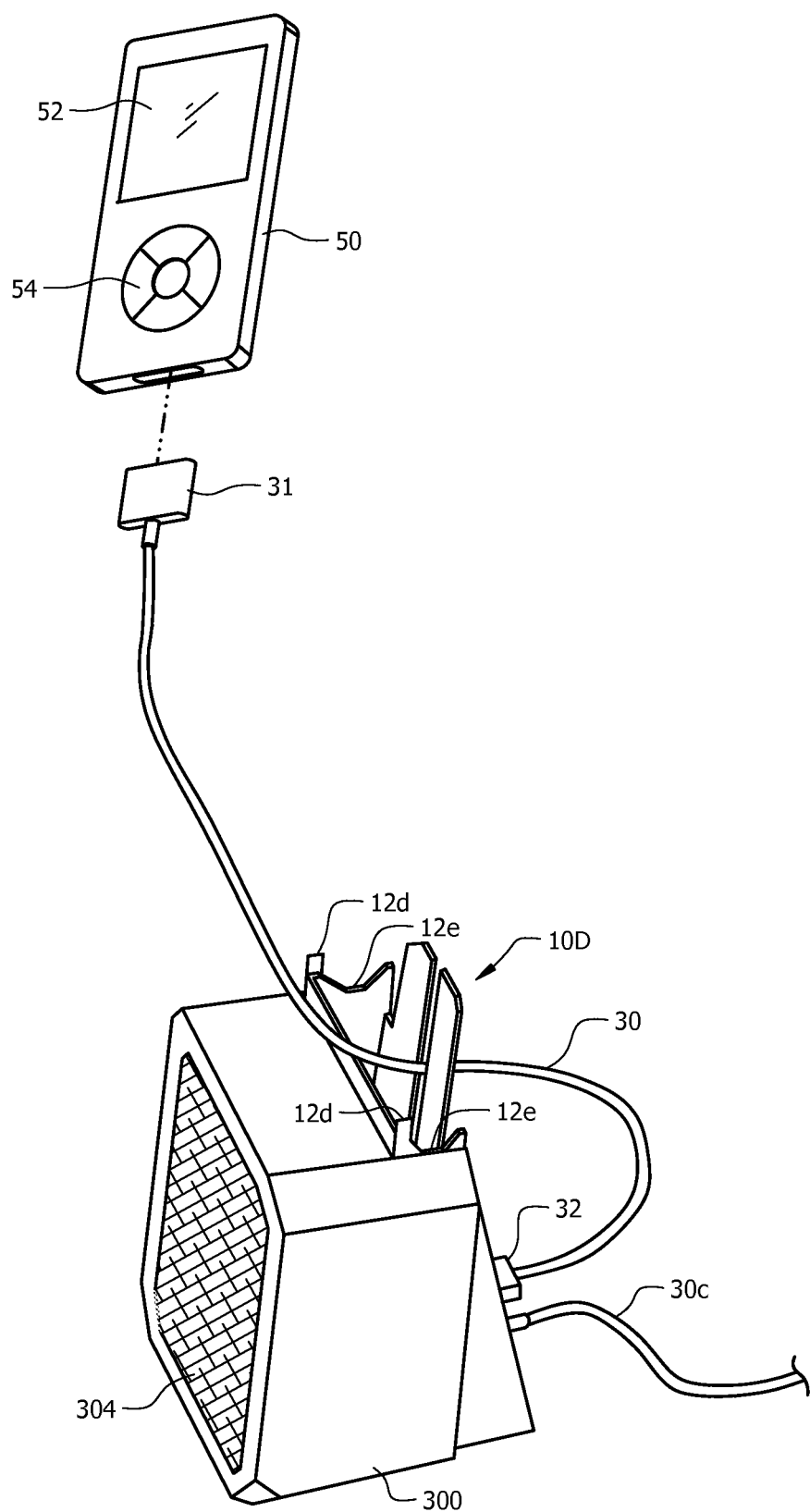
FIG. 9 illustrates a side perspective view of an external speaker for use with a consumer electronic system having a cradle.

Referring to FIG. 9, a side perspective view of an external speaker 300 for use with a consumer electronic system 200 having a cradle 10D is shown. This external speaker 300 works with another consumer electronic system 200/400 and provides both a detached speaker 304 as well as an additional cradles 10D for supporting and/or charging an additional consumer electronic device 50/56/60. It is anticipated that the external speaker 300 has either a fixed cradle 10D or a removably affixed cradle 10D as described above. It is anticipated that any style and/or size of cradle 10D be used with the external speaker 300, including the stepped version for supporting a variety of sizes of consumer electronic devices 50/56/60.

A consumer electronic device 50 having a display 52 and controls 54 is shown in FIG. 9. Also shown is a cable 30 that has a device plug 31 that interfaces with the device and a standard USB plug 32 that interfaces with a USB port on the external speaker 300. The cable 30 is routed through the cable trough (slot) 20 when the consumer electronic device 50 is positioned within the cradle 10D. Optionally, the consumer electronic device is rotated 90 degrees or −90 degrees and the cable 30 is not routed through the cable trough 20.

The speaker system 300 is interfaced to the consumer electronic system 200/400 by another USB cable 30c and/or a separate audio cable (not shown) as needed.

Figure 10:
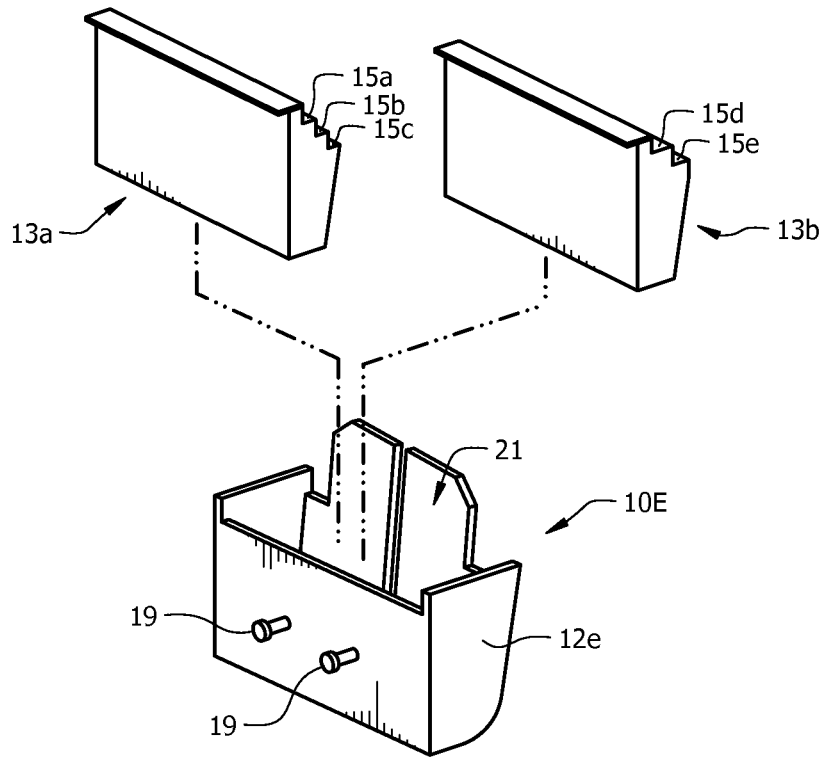
FIG. 10 illustrates a front perspective exploded view of cradle a consumer electronic system having a stepped insert.
Figure 11:
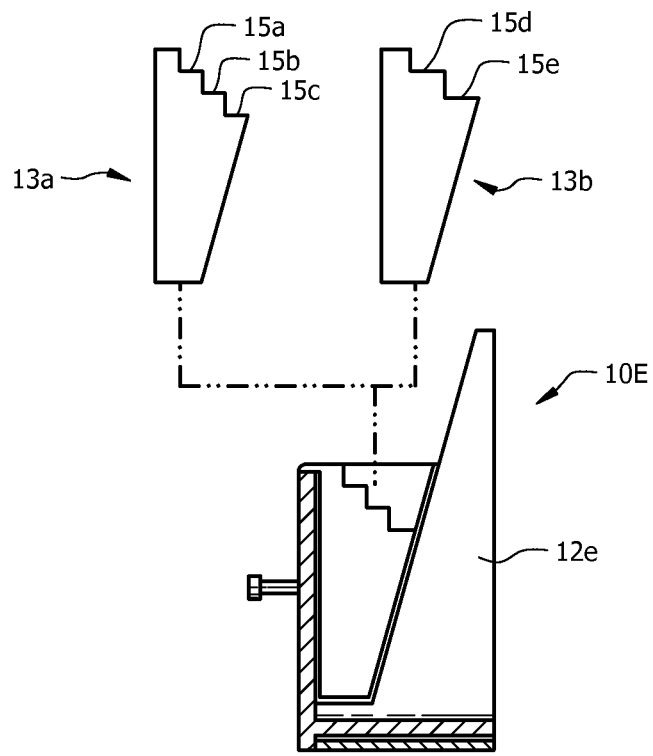
FIG. 11 illustrates a side exploded view of cradle a consumer electronic system having a stepped insert.

Referring to FIGS. 10 and 11, a front perspective exploded view and a side exploded view of cradle a consumer electronic system having a stepped insert are shown. Although the stepped, multi-ledge design provides for snug support of several sizes of consumer electronic devices, there are many sizes and shapes of consumer electronic devices. Some are thinner than others, some are thicker than others, some have rounded edges, some have sharp edges, and some are wide, while some are narrow. Due to the number of possible sizes, it is very difficult to provide one cradle 208/210/212/10A/10B/10C/10D that will snuggly hold all possible sizes and shapes of consumer electronic devices. To address this limitation, the cradle 10E has a blank cavity 21 for accepting inserts 13A/13B. Although two inserts 13A/13B are shown, any number and size/shape of inserts 13A/13B are anticipated. In the examples shown, the first insert 13A has three steps 15A/15B/15C and snuggly supports three sizes of consumer electronic devices while the second insert 13B has two steps 15D/15E and snuggly supports two sizes of consumer electronic devices. Any number of steps 15A/15B/15C/15D/15E is anticipated. In the examples shown, the steps 15A/15B/15C/15D/15E provide for various thicknesses of consumer electronic devices. In some inserts 13A/13B, also have side steps (not shown) to snuggly fit different widths of consumer electronic devices.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A consumer electronic system comprising:
an enclosure; and
three cradles extending from the enclosure, each cradle having a cavity and a support wall, the cavity sized to contain at least one portion of at least a first consumer electronic device, the first consumer electronic device resting against the support wall;
a first cradle of the three cradles positioned between and behind a second and third cradle of the three cradles such that a second consumer electronic device supported by the first cradle rests against the support wall of the first cradle and an edge of the second consumer device rests against a back surface of the support walls of at least one of the second and third cradles.

2. The consumer electronic system of claim 1, wherein the first consumer electronic device is selected from the group consisting of a music player or a cellular phone, and the second consumer electronic device is a table computer.

3. The consumer electronic system of claim 1, wherein at least one of the cradles is removably attached to the enclosure.

4. The consumer electronic system of claim 1, wherein the support wall of at least one of the cradles includes a cable trough for routing a cable between the consumer electronic system and a consumer electronic device held by the cradles.

5. The consumer electronic system of claim 1, wherein the cavity includes at least two steps such that the cavity and the steps snuggly support at least two sizes and/or shapes of consumer electronic devices selected from the set of consumer electronic devices.

6. The consumer electronic system of claim 1, wherein the consumer electronic system of claim 1 further includes means for managing cables.

7. The consumer electronic system of claim 1, wherein the consumer electronic system is a clock radio having controls, at least one speaker, and a display.

8. The consumer electronic system of claim 1, wherein the consumer electronic system includes at least three industry standard ports, each of the industry standard ports providing power to consumer electronic devices that are held by the cradles.

9. A method of charging a consumer electronic device, the method comprising:
   connecting a first end connector of a data/power cable to a first consumer electronic device, the data/power cable designed for the first consumer electronic device;
   routing the data/power cable through a cable trough of a first cradle of three cradles, the three cradles attached to a consumer electronic system, the first cradle staggered behind and between a second cradle and a third cradle of the three cradles;
   placing the first consumer electronic devices into the first cradle, a back side of the first consumer electronic device resting against a support wall of the first cradle and a forward edge of the first consumer electronic device held by at least one back side of the support wall of one of the second and third cradles; and
   plugging a second end connector of the data/power cable into a receptacle of the consumer electronic system, thereby providing power to the first consumer electronic device.

10. The method of claim 9, further comprising:
    connecting a first end connector of a second data/power cable to a second consumer electronic device, the second data/power cable designed for the second consumer electronic device;
    routing the data/power cable through a cable trough of the second cradle of the three cradles;
    placing the second consumer electronic devices into the second cradle, a back side of the second consumer electronic device resting against a support wall of the second cradle and the second consumer electronic device held within a cavity of the second cradle; and
    plugging a second end connector of the second data/power cable into a second receptacle of the consumer electronic system, thereby providing power to the second consumer electronic device.

11. The method of claim 10, further comprising:
    connecting a first end connector of a third data/power cable to a third consumer electronic device, the third data/power cable designed for the third consumer electronic device;
    routing the third data/power cable through a cable trough of the third cradle of three cradles;
    placing the second consumer electronic devices into the third cradle, a back side of the third consumer electronic device resting against a support wall of the third cradle and the third consumer electronic device held within a cavity of the third cradle; and
    plugging a second end connector of the third data/power cable into a third receptacle of the consumer electronic system, thereby providing power to the third consumer electronic device.

12. The method of claim 9, wherein the consumer electronic system is a clock radio.

13. The method of claim 9, further comprising:
    removing the third cradle from the consumer electronic system;
    attaching a different cradle to the consumer electronic system;
    connecting a first end connector of a fourth data/power cable to a fourth consumer electronic device, the fourth data/power cable designed for the fourth consumer electronic device;
    routing the fourth data/power cable through a cable trough of the different cradle;
    placing the fourth consumer electronic device into the different cradle, a back side of the fourth consumer electronic device resting against a support wall of the different cradle and the fourth consumer electronic device held within a cavity of the different cradle; and
    plugging a second end connector of the fourth data/power cable into a third receptacle of the consumer electronic system, thereby providing power to the fourth consumer electronic device.

14. The method of claim 9, further comprising the steps of:
    connecting a first end connector of an audio cable to an audio output connector of the first consumer electronic device;
    connecting a second end connector of the audio cable to an audio input jack of the consumer electronic system.

15. A consumer electronic system comprising:
    an enclosure; and
    three cradles extending upward from a back surface of the enclosure, each cradle having a cavity and a support wall, the cavity sized to partially contain at least a first consumer electronic device, the first consumer electronic device resting against the support wall, the support wall having a cable trough;
    a first cradle of the three cradles positioned between and behind a second and third cradle of the three cradles such that a second consumer device supported by the first cradle rests against the support wall of the first cradle and an edge of the second consumer device rests against a back surface of the support walls of at least one of the second and third cradles.

16. The consumer electronic system of claim 15, wherein at least one of the cradles is removably attached to the enclosure.

17. The consumer electronic system of claim 15, wherein the cavity includes at least two steps such that the cavity and the steps snuggly support at least two sizes and/or shapes of consumer electronic devices selected from the set of consumer electronic devices.

18. The consumer electronic system of claim 15, wherein the consumer electronic system further includes means for managing cables.

19. The consumer electronic system of claim 15, wherein the consumer electronic system is a clock radio having controls, at least one speaker, and a display.

20. The consumer electronic system of claim 15, wherein the consumer electronic system includes at least three industry standard ports, each of the industry standard ports providing power to consumer electronic devices that are held by the cradles.

* * * * *